(12) United States Patent
Osada

(10) Patent No.: US 7,178,032 B2
(45) Date of Patent: Feb. 13, 2007

(54) PERIPHERAL APPARATUS, SERVER, INFORMATION PROCESSING SYSTEM, AND CONTROL METHOD

(75) Inventor: Mamoru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 10/347,935

(22) Filed: Jan. 22, 2003

(65) Prior Publication Data

US 2003/0154374 A1    Aug. 14, 2003

(30) Foreign Application Priority Data

Feb. 8, 2002  (JP) .............................. 2002-032764

(51) Int. Cl.
*G06F 11/30*  (2006.01)
(52) U.S. Cl. ...................... 713/182; 713/168
(58) Field of Classification Search ......... 713/182–168
See application file for complete search history.

(56) References Cited

U.S. PATENT DOCUMENTS 6,211,966 B1  4/2001  Osada et al. ............... 358/1.13
6,327,446 B1  12/2001  Suzuki ......................... 399/75
2001/0017700 A1  8/2001  Homma ...................... 358/1.1

*Primary Examiner*—Thomas R. Peeso
(74) *Attorney, Agent, or Firm*—Fitzpatrick, Cella, Harper & Scinto

(57) ABSTRACT

A peripheral apparatus which can communicate with a server via a network has: user interface means for operating the peripheral apparatus; communicating means for performing a log-in to the server; information obtaining means for obtaining operating environment information of the log-in user from operating environment managing means of each user of the server when the user is authenticated by the server; user interface constructing means for constructing a user interface such as an operating picture plane or the like in accordance with the operating environment information of the user; program downloading means for, when execution of a predetermined program held by program information managing means of each user on the server is instructed by the user interface means, downloading the program whose execution has been instructed from the server; data managing means for holding the downloaded program; and program executing means for executing the downloaded program. A server which communicates with the peripheral apparatus and a system including those apparatuses are also disclosed.

19 Claims, 9 Drawing Sheets

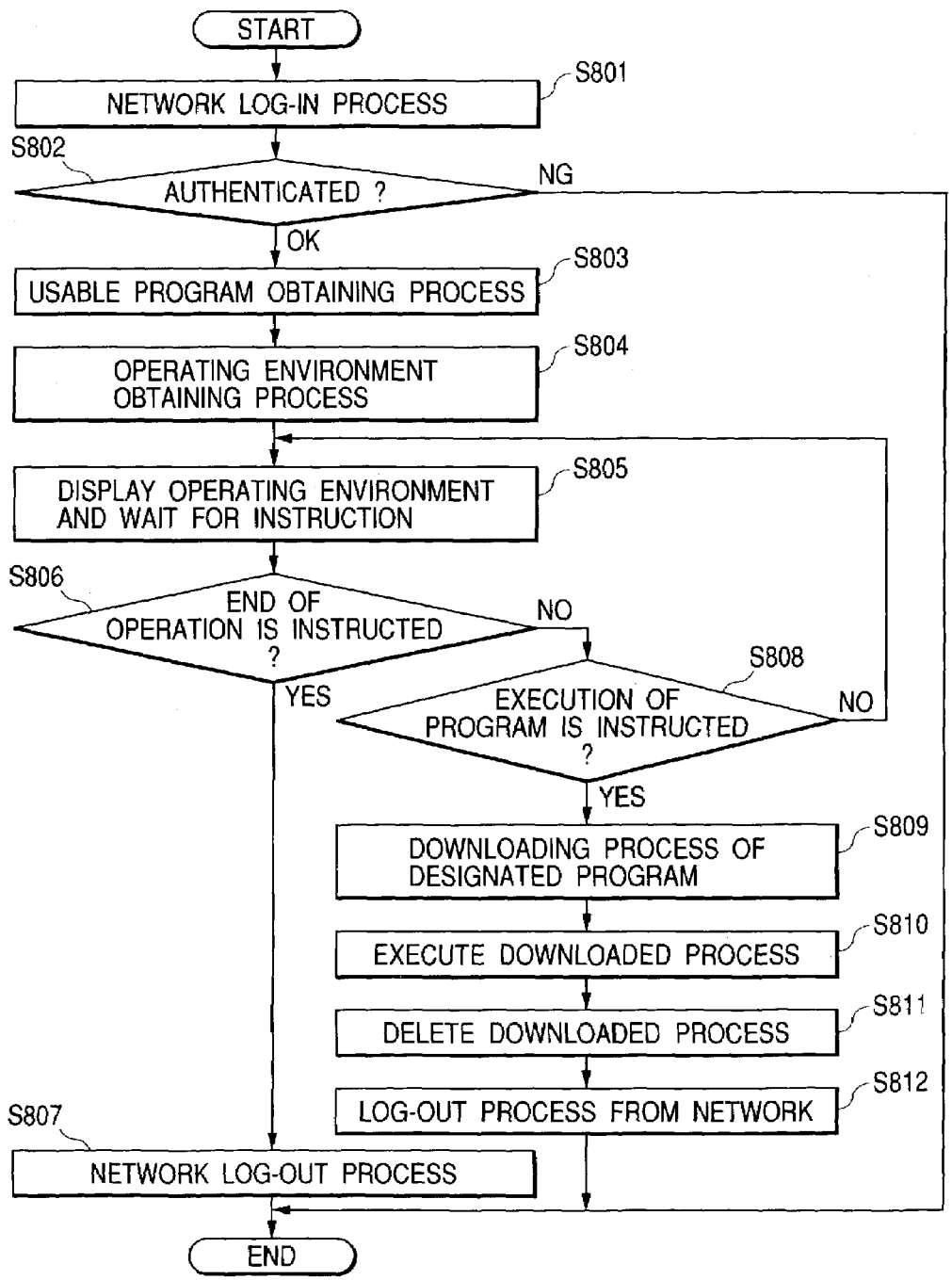

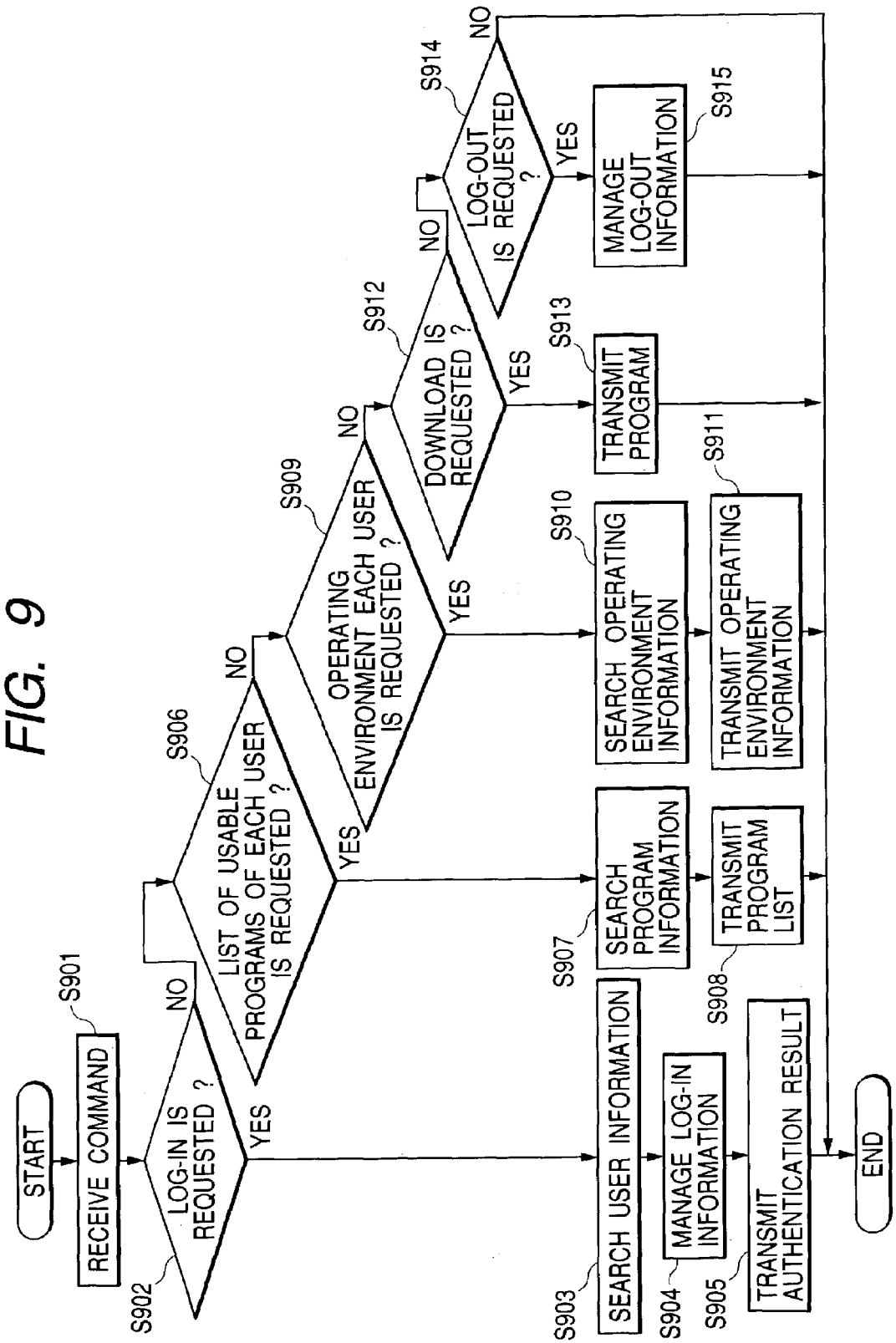

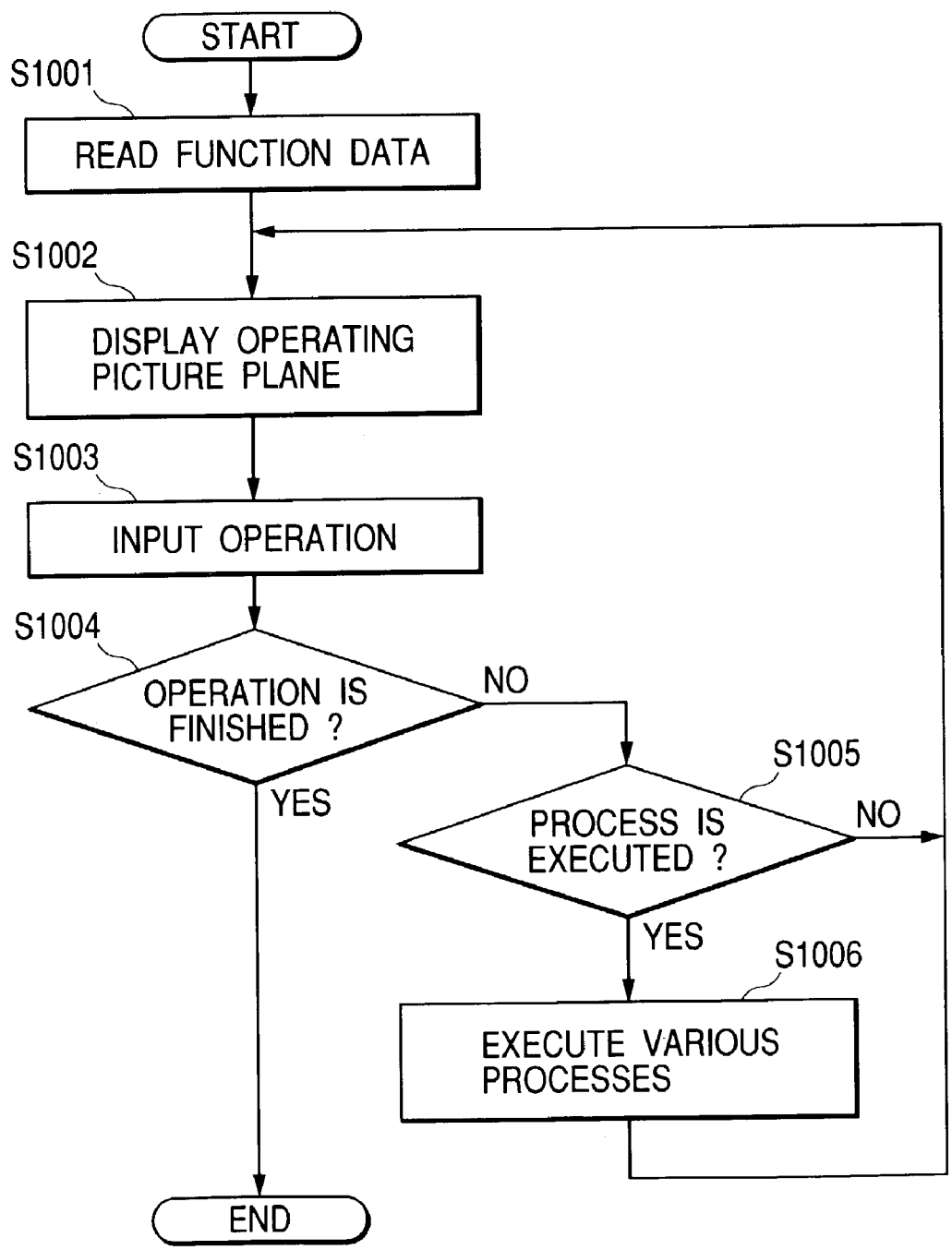

PERIPHERAL APPARATUS, SERVER, INFORMATION PROCESSING SYSTEM, AND CONTROL METHOD

BACKGROUND OF THE INVENTION

1. Field of the Invention

The invention relates to a peripheral apparatus, a server which communicates with the peripheral apparatus, and an information processing system including them.

2. Related Background Art

Hitherto, in a peripheral apparatus having an authenticating function of the user, in many cases, a range of the authentication is provided for limiting use of the peripheral apparatus itself or a specific function which is provided by the peripheral apparatus.

In an information processing system which is connected to a network and has a server for user authentication, the server mainly exists only for management and authentication of user authentication information or sharing data.

A process for operating the peripheral apparatus itself is provided by each of the peripheral apparatuses itself.

According to the above-mentioned conventional technique, there are problems such that when a plurality of peripheral apparatuses existing on the network are operated, despite a common existence of the authentication server, an operating method of each peripheral apparatus needs to conform with an operating specification of each peripheral apparatus, names of a certain same function are not unified or procedures for shifting a current picture plane to an operating picture plane for using a certain function are different among apparatuses which provide different functions, and the like, so that operability of respective peripheral apparatuses is not unified.

Those problems are caused because an operating program constructing a user interface of each peripheral apparatus exists as an individual program although there is a possibility that it is used in a same network environment.

Further, the user interface of each peripheral apparatus has been constructed so that all functions can be always used, and there is a tendency such that the operation is complicated for the user who uses the apparatus only by a certain specific using method.

SUMMARY OF THE INVENTION

The invention is made to solve the problems which the conventional technique as mentioned above has and it is one aspect of the invention to provide an information processing system, a server, a peripheral apparatus, a control method of the information processing system, a control method of the server, a control method of the peripheral apparatus, a control program for the information processing system, a control program for the server, a control program for the peripheral apparatus, and a memory medium which can improve operability.

According to the invention, there is provided an information processing system having a server for holding information to manage and authenticate the users who can use a network environment in which a plurality of peripheral apparatuses and a plurality of computers are connected via a network. The server included in this system comprises: communicating means for communicating with another terminal or the like of the network environment; user information managing means for managing user information for user authentication; program information managing means, provided for each user, for holding program information which has been held by the user information managing means and can be used every user; and operating environment managing means, provided for each user, for holding an operating environment of each user held by the user information managing means. The peripheral apparatus comprises: user interface means for operating the apparatus on the peripheral apparatus; communicating means for performing a log-in as a network terminal to the server; information obtaining means for obtaining operating environment information of the log-in user from the operating environment managing means of each user of the server when the user is authenticated in the server; user interface constructing means for constructing a user interface such as an operating picture plane or the like in accordance with the operating environment information of the user; program downloading means for, when execution of a predetermined program held by the program information managing means of each user on the server is instructed by the user interface means, downloading the program whose execution has been instructed from the server; data managing means for holding the downloaded program; and program executing means for executing the downloaded program, wherein the program on the server is downloaded onto the peripheral apparatus and executed.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 8 is a flowchart showing a flow for the operation of the peripheral apparatus according to the embodiment of the invention;

FIG. 9 is a flowchart showing a flow for the operation of the user authenticating server according to the embodiment of the invention; and FIG. 10 is a flowchart showing a flow for the operation of a program which is executed on the peripheral apparatus according to the embodiment of the invention.

DETAILED DESCRIPTION OF THE PREFERRED EMBODIMENT

An embodiment of the invention will be described hereinbelow with reference to the drawings.

Figure 1:
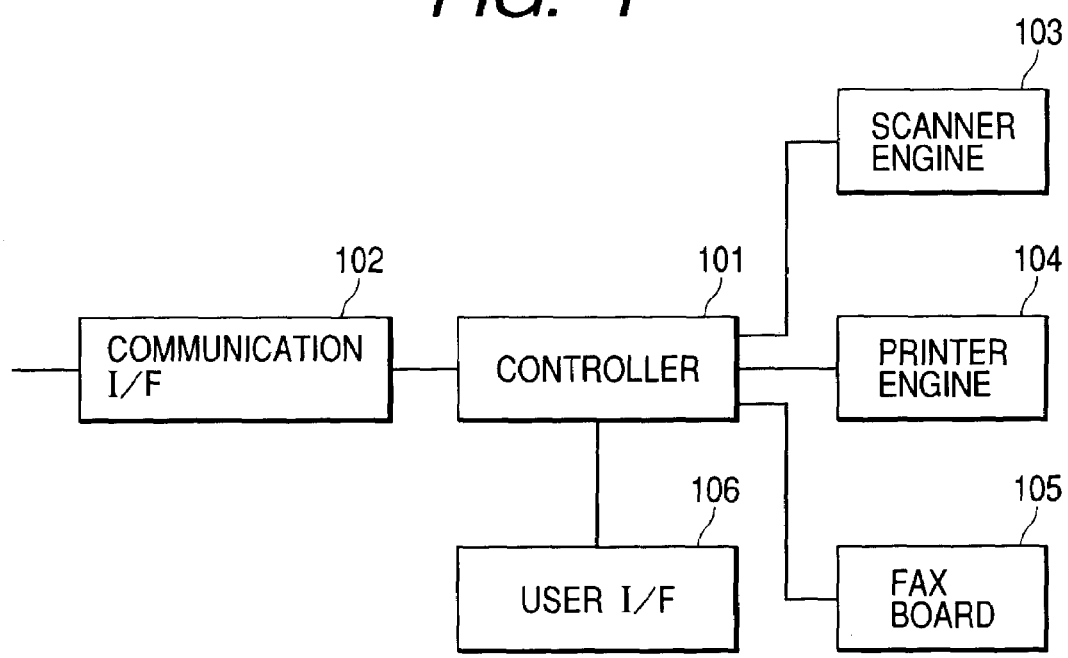
FIG. 1 is a block diagram showing a whole construction of peripheral apparatuses according to an embodiment of the invention.
Figure 2:
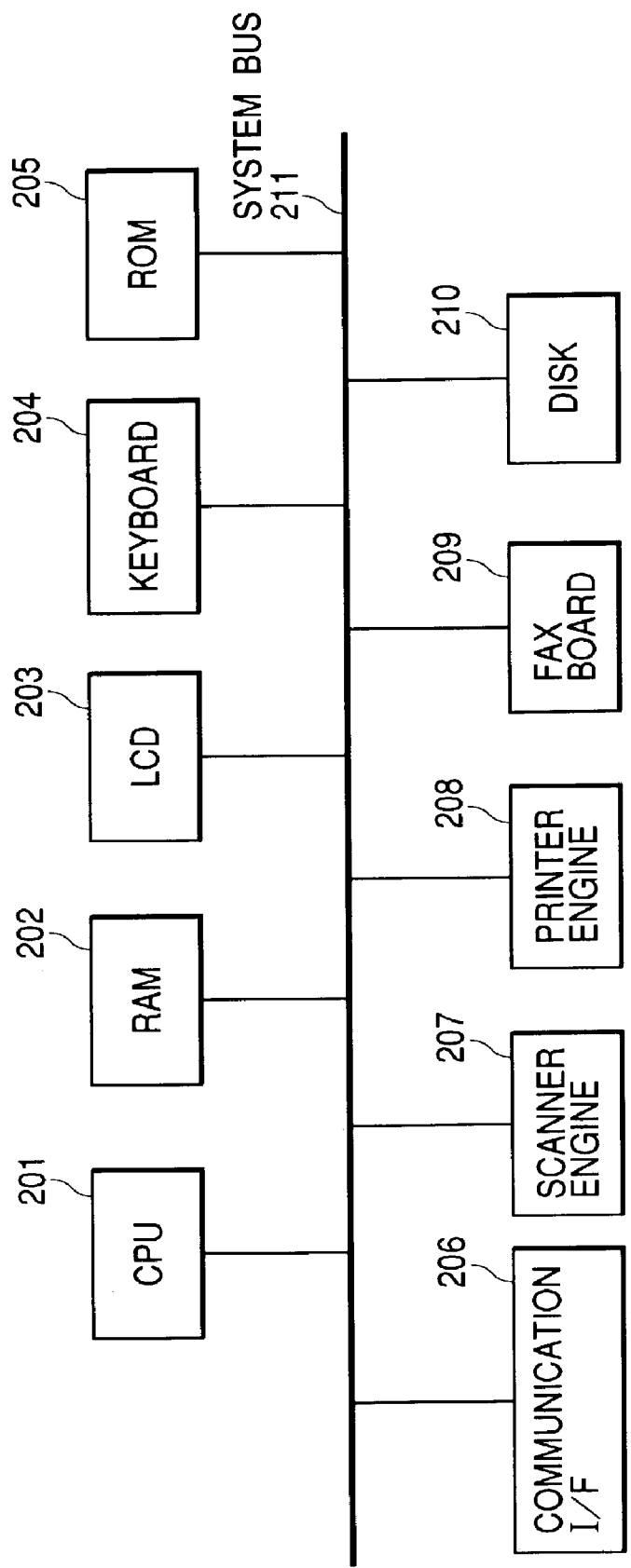
FIG. 2 is a block diagram showing a hardware construction of a controller in FIG. 1.

FIG. 1 is a block diagram showing a whole construction of peripheral apparatuses according to the embodiment of the invention. In the diagram, reference numeral 101 denotes a controller for controlling all of the peripheral apparatuses. The controller 101 has a hardware construction as shown in FIG. 2, which will be explained hereinlater. Reference numeral 102 denotes a communication interface (I/F) for allowing the controller 101 to communicate with an external apparatus of the peripheral apparatus. As such a communication interface 102, for example, an Ethernet interface, an IEEE1284 interface, or another communication interface can be used. Reference numeral 103 denotes a scanner engine which is controlled by the controller 101. Reference numeral 104 denotes a printer engine which is controlled by the controller 101. For example, a laser beam printer, an ink jet printer, or another printer can be used as a printer engine 104. Reference numeral 105 denotes a facsimile (FAX) board for realizing a FAX function such as communication control or the like upon transmission and reception of an image. The FAX board 105 is controlled by the controller 101. Reference numeral 106 denotes a user interface (I/F) constructed by a display comprising an LCD (Liquid Crystal Display) or the like, a keyboard, and the like. The user I/F 106 has functions for displaying information from the controller 101 and transferring an instruction from the user to the controller 101.

The peripheral apparatus according to the embodiment with the construction as mentioned above allows the scanner engine 103 to be selected and enables a scan job to be issued. The peripheral apparatus also allows the printer engine 104 and the scanner engine 103 to be selected and enables a copy job to be issued. The peripheral apparatus also allows the printer engine 104, the scanner engine 103, and the FAX board 105 to be selected and enables a FAX reception job and a FAX transmission job to be issued.

FIG. 2 is a block diagram showing a schematic construction of hardware mainly regarding the controller 101 in FIG. 1. As shown in FIG. 2, the controller 101 shown in FIG. 1 is constructed by mutually connecting the following component elements via a system bus 211: a CPU (Central Processing Unit) 201; a RAM (Random Access Memory) 202; an LCD 203; a keyboard 204; a ROM (Read Only Memory) 205; a communication interface 206; a scanner engine 207; a printer engine 208; a FAX board 209; and a DISK (storing means) 210.

A program to control the controller 101 in FIG. 1 has been stored in the ROM 205 or the DISK 210 and is read out therefrom and stored into the RAM 202 as necessary and executed by the CPU 201. Besides the control program, attribute information showing functions and statuses of the peripheral apparatuses and of jobs which are processed by the peripheral apparatus, job data serving as a target of an output, and the like have been stored in the ROM 205 and the DISK 210. The CPU 201 allows the LCD 203 to display information, a message, or the like and receives an instruction from the user via the keyboard 204. The CPU 201 communicates with an external apparatus via the communication interface 206.

In the embodiment, in the peripheral apparatus in FIG. 1, the CPU 201 receives an input of the user from the keyboard 204 via the system bus 211 and controls the RAM 202, LCD 203, ROM 205, communication interface 206, scanner engine 207, printer engine 208, FAX board 209, and DISK 210, thereby executing various processes unless otherwise specified.

Figure 3:
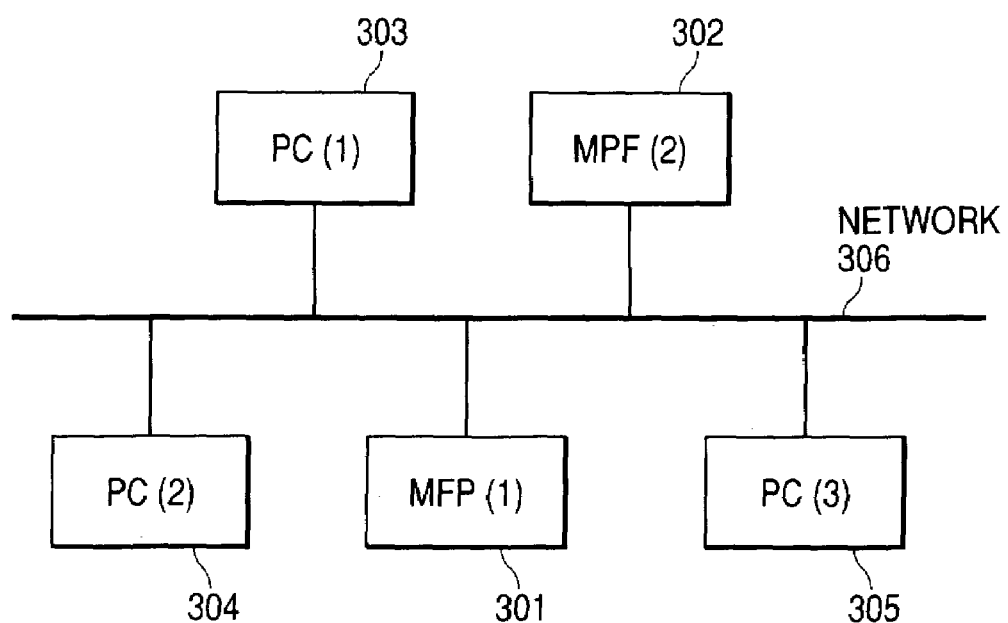
FIG. 3 is a block diagram showing an example of a network construction on which the peripheral apparatuses in FIG. 1 operate.
Figure 4:
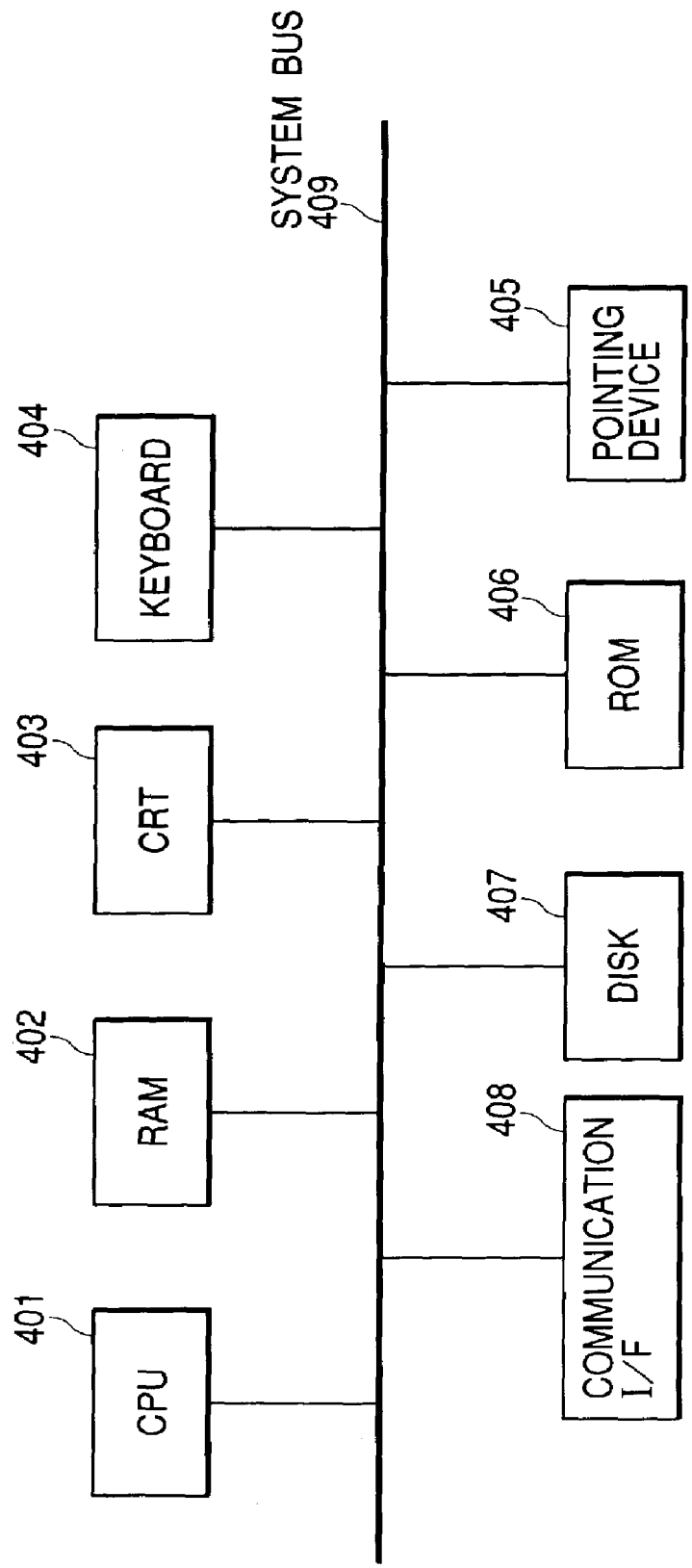
FIG. 4 is a block diagram showing a hardware construction of a PC constructing a system in FIG. 3.

FIG. 3 is a block diagram showing an example of a construction of a network system in which the peripheral apparatuses shown in FIG. 1 operate. In the diagram, reference numerals 301 and 302 denote MFPs (MultiFunction Peripherals: hybrid apparatuses) and correspond to the peripheral apparatuses shown in FIG. 1. Reference numeral 303 denotes a PC(1); 304 a PC(2); and 305 a PC(3). Each of the PC(1) 303, PC(2) 304, and PC(3) 305 has a hardware construction as shown in FIG. 4, which will be explained hereinlater and indicates the PC (Personal Computer) connected to the MFPs 301 and 302 via a network 306. A workstation, another peripheral apparatus, or another equipment can be also connected to the MFPs 301 and 302 via the network 306.

In the embodiment, it is assumed that the PC(1) 303 is a server to which the embodiment is applied.

FIG. 4 is a block diagram showing the hardware construction of the PC constructing the network system of FIG. 3. As shown in FIG. 4, the PC is constructed by mutually connecting the following component elements via a system bus 409: a CPU 401; a RAM 402; a CRT (Cathode Ray Tube) 403; a keyboard 404; a pointing device 405; a ROM 406; a DISK 407; and a communication interface 408.

A program to control the PC has been stored in the ROM 406 or the DISK 407 and is read out therefrom and stored into the RAM 402 as necessary and executed by the CPU 401. The CPU 401 allows the CRT 403 to display and receives an instruction of the user from the keyboard 404 and the pointing device 405. The CPU 401 communicates with an external apparatus via the communication interface 408.

In the embodiment, in the PC in FIG. 4, the CPU 401 receives an input of the user from the keyboard 404 and the pointing device 405 via the system bus 409 and controls the RAM 402, CRT 403, ROM 406, DISK 407, and communication interface 408, thereby executing various processes unless otherwise specified.

Figure 5:
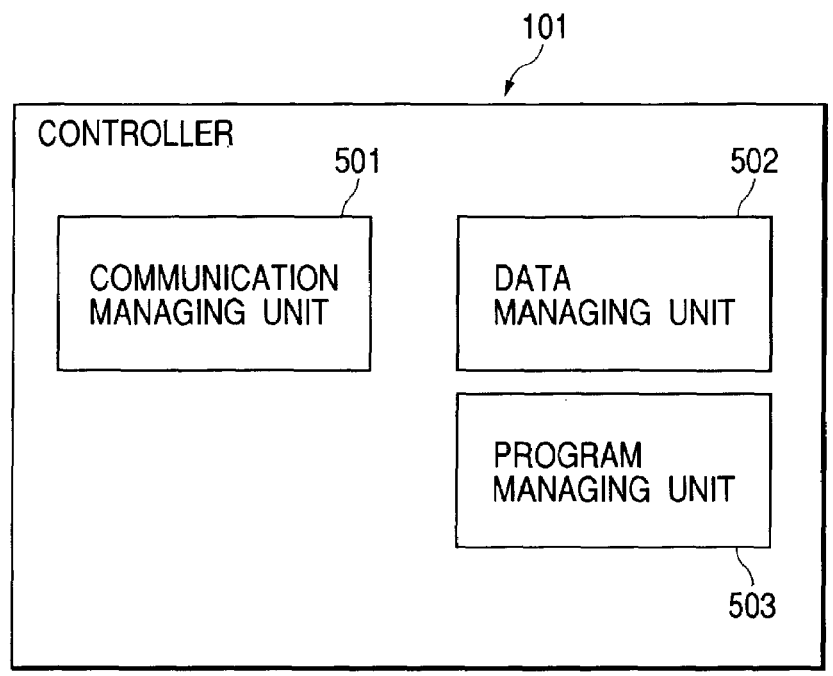
FIG. 5 is a diagram showing a system construction in the controller of the peripheral apparatuses according to the embodiment of the invention.

FIG. 5 is a diagram showing a system construction of the controller 101 of the MFPs 301 and 302 as peripheral apparatuses according to the embodiment. In the diagram, reference numeral 501 denotes a communication managing unit (communication managing means) for analyzing a communication command which is transmitted or received via the communication interface 206 and making communication control; 502 a data managing unit (data managing means) for managing various data which is controlled by the controller 101; and 503 a program managing unit (program managing means) for controlling and managing execution of permanently stationed or non-permanently stationed program which is managed by the data managing unit 502.

Figure 6:
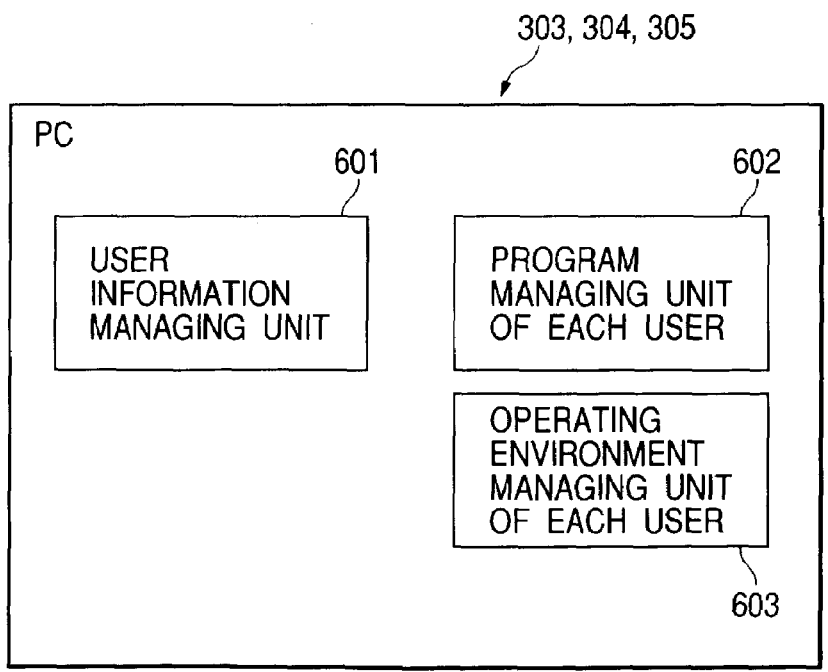
FIG. 6 is a diagram showing a system construction of a user authenticating server according to the embodiment of the invention.

FIG. 6 is a diagram showing a system construction of a PC serving as a user authenticating server according to the embodiment. In the diagram, reference numeral 601 denotes a user information managing unit (user information managing means) for managing information to authenticate the user which is inquired via the communication interface 206 from each terminal connected to the network 306. Reference numeral 602 denotes a program managing unit (program managing means) of each user for managing a program which has been managed by the user information managing unit 601 and can be used every user. In the embodiment, it is assumed that the program managing unit 602 manages operating applications of peripheral apparatuses connected to the network 306.

The information which is managed by the program managing unit 602 of each user is not limited to the scope of the embodiment. Reference numeral 603 denotes an operating environment managing unit (operating environment managing means) of each user for managing an operating environment of each user managed by the user information managing unit 601. In the embodiment, it is assumed that the operating environments have been ranked in accordance with use frequencies of the applications used by the specific user.

The information which is managed by the operating environment managing unit 603 of each user is not limited to the scope of the embodiment.

Figure 7:
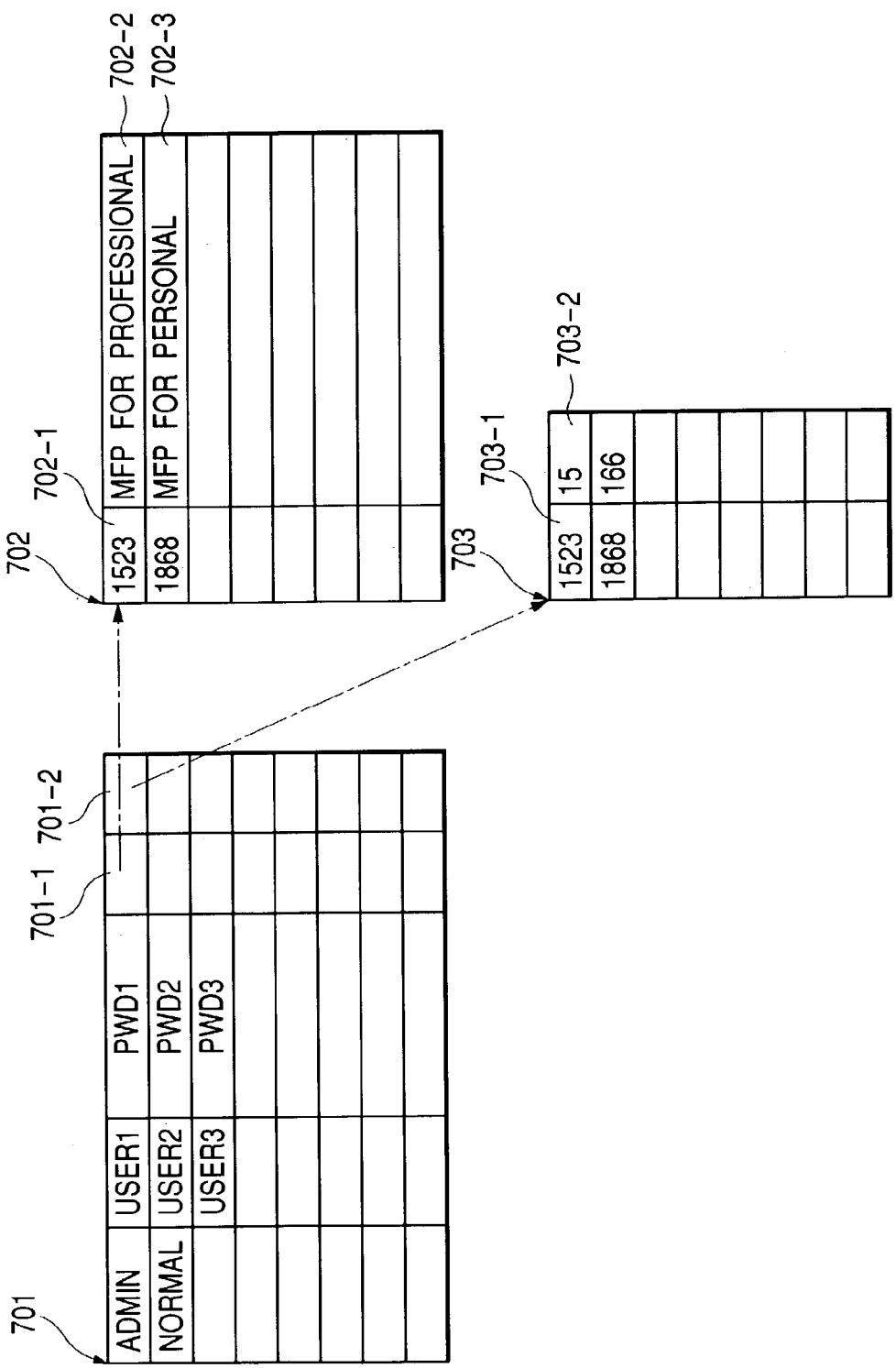
FIG. 7 is an association diagram of a data table held by the user authenticating server according to the embodiment of the invention.

FIG. 7 is an association diagram of a data table held by the user authenticating server according to the embodiment. In the diagram, reference numeral 701 denotes a user information management table for authentication. Each record is mainly managed by the user information managing unit 601 in FIG. 6. Information which is managed as user information is generally a user ID and a password. In the embodiment, their contents are not particularly limited.

Reference numeral 701-1 denotes a first field for storing reference information into a program management table 702 for managing a program of each user, which will be explained hereinlater. A referring method in this case is not particularly limited to the contents in the embodiment.

Reference numeral 701-2 denotes a second field for storing reference information into an operating environment management table 703 for managing operating environment information of each user, which will be explained hereinlater. A referring method in this case is not particularly limited to the contents in the embodiment.

Reference numeral 702 denotes the program management table for managing the program of each user. This table is mainly managed by the program managing unit 602 of each user in FIG. 6. It is assumed that a list of the programs which can be used by the user in the first field 701-1 has been managed in the table 702.

The information to manage the programs is not particularly limited to the format in the embodiment.

Reference numeral 702-1 denotes a program identification (ID) number as a unique number which is allocated to each program.

Reference numeral 702-2 denotes a copy program for the power users of the peripheral apparatuses MFP(1) 301 and MFP(2) 302 and is a program that enables all of the copying functions provided for the peripheral apparatuses MFP(1) 301 and MFP(2) 302 to be made operative.

It is assumed that reference information to the substance of the program stored in either the RAM 402 or the DISK 407 has been stored in this table.

Reference numeral 702-3 denotes a copy program for the general users of the peripheral apparatuses MFP(1) 301 and MFP(2) 302 and is a program that enables only the fundamental functions among the copying functions provided for the peripheral apparatuses MFP(1) 301 and MFP(2) 302 to be made operative.

It is assumed that reference information to the substance of the program stored in either the RAM 402 or the DISK 407 has been stored in this table.

Reference numeral 703 denotes the operating environment management table for managing the operating environment of each user. The operating environments are mainly managed by the operating environment managing unit 603 of each user in FIG. 6.

Reference numeral 703-1 denotes an identification number of the program shown by the program ID number 702-1.

Reference numeral 703-2 denotes the number of using times of the program shown by the ID number 703-1 of the program.

The user operating environment information is not particularly limited to the contents in the embodiment. The program management table 702 can be used as it is in accordance with the contents which are managed by the operating environment managing unit 603 of each user and is not particularly limited to a table construction in the embodiment.

FIG. 8 is a flowchart showing a flow for the operation of the peripheral apparatus according to the embodiment.

In FIG. 8, step S801 is a network log-in processing step for performing a log-in to the user authenticating server PC(1) 303. In this processing step, the user information inputted by the operation from the user I/F 106 in FIG. 1 is sent to the user authenticating server PC(1) 303 via the communication managing unit 501 in FIG. 5 and the communication I/F 102 in FIG. 1, thereby obtaining an authentication result.

In step S802, whether authentication has been obtained from the user authenticating server PC(1) 303 or not is confirmed. If the authentication is obtained, step S803 follows. If the authentication is not obtained, the process in the present flowchart is finished.

In step S803, the list of the programs which can be used every user is obtained from the user authenticating server PC(1) 303. In this processing step, the user authenticating server PC(1) 303 is inquired by means such as a command or the like via the communication managing unit 501 in FIG. 5 and the communication I/F 102 in FIG. 1, thereby obtaining the list.

It is assumed that the user information, a ticket obtained in step S801, or the like has been added to the command.

In step S804, the operating environment information of each user is obtained from the user authenticating server PC(1) 303. In this processing step, the user authenticating server PC(1) 303 is inquired by means such as a command or the like via the communication managing unit 501 in FIG. 5 and the communication I/F 102 in FIG. 1, thereby obtaining the operating environment information.

It is assumed that the user information, a ticket obtained in step S801, or the like has been added to the command.

In step S805, the user is allowed to operate via the user I/F 106. In the embodiment, it is assumed that the program lists obtained in step S803 are listed in order of the number of using times from the larger number on the basis of the information obtained in step S804.

In step S806, whether the end of the operation has been instructed in step S805 or not is discriminated. If the end of the operation is instructed, step S807 follows. If the end of the operation is not instructed, step S808 follows.

In step S807, a log-out from the user authenticating server PC (1) 303 to which the log-in has been performed in step S801 is performed in accordance with the operation end instruction.

In step S808, whether execution of the program has been instructed or not is discriminated. If the execution of the program is instructed, step S809 follows. If the execution of the program is not instructed, a process other than those shown in the flowchart is executed or the processing routine is returned to step S806.

In step S809, the program whose execution has been instructed is downloaded. In this processing step, a downloading request is issued to the user authenticating server PC (1) 303 via the communication managing unit 501 in FIG. 5 by using the program ID number 702-1 to specify the instructed program via the user I/F 106 in FIG. 1. When program data is transferred from the user authenticating server PC (1) 303, it is stored into the RAM 402 or the DISK 407 via the data managing unit 502 in FIG. 5.

In step S810, the program obtained in step S809 is executed. The program is executed via the program managing unit 503 in FIG. 5.

In step S811, in the program managing unit 503 in FIG. 5, when the end of the downloaded program is detected, the program is deleted. The program obtained in step S809 is deleted from the RAM 402 or the DISK 407 via the data managing unit 502 in FIG. 5.

In step S812, a log-out process from the network is performed. After completion of the present processing routine, the processes in the present flowchart are finished.

FIG. 9 is a flowchart showing a flow for the operation of the user authenticating server (network server) PC (1) 303 according to the embodiment.

In FIG. 9, various communication commands which are received from the communication I/F 408 in FIG. 4 are analyzed in step S901.

In step S902, whether the received command is a log-in request command or not is discriminated. If it is the log-in request command, step S903 follows. If it is not the log-in request command, step S906 follows.

In step S903, on the basis of user information which requests the low-in, whether data has been registered in the user information management table 701 or not is discriminated or whether the user information coincides with registered contents or not is confirmed via the user information managing unit 601 in FIG. 6.

In step S904, log-in information is managed on the basis of a result of the search for the user information in step S903. It is assumed that the information which is held in step S903 is held in the RAM 402 or the DISK 407.

In step S905, a result of the authentication is sent on the basis of the search result of the user information in step S903. The authentication result is returned to the peripheral apparatus side via the communication interface 408 in FIG. 4.

If the information is not correctly registered in the user information managing unit 601 in FIG. 6, the authentication fails.

In step S906, whether the command is a command for requesting a list of programs which can be used by each user or not is discriminated. If it is the program list request command, step S907 follows. If it is not the program list request command, step S909 follows.

In step S907, the program information is searched. A list of the programs is obtained from the program management table 702 in FIG. 7 via the program managing unit 602 of each user in FIG. 6 by tracing the reference information stored in the first field 701-1 from the user information management table 701 in FIG. 7 via the user information managing unit 601 in FIG. 6 from the user information added to the command or the information such as a log-in ticket or the like.

In step S908, the program list obtained in step S907 is transmitted. This program list is returned to the peripheral apparatus side via the communication interface 408 in FIG. 4.

In step S909, whether the command is an operating environment request command of each user or not is discriminated. If it is the operating environment request command, step S910 follows. If it is not the operating environment request command, step S912 follows.

In step S910, the operating environment information is obtained from the operating environment management table 703 of each user in FIG. 7 via the operating environment managing unit 603 of each user in FIG. 6 by tracing the reference information stored in the second field 701-2 from the user information management table 701 in FIG. 7 via the user information managing unit 601 in FIG. 6 from the user information added to the operating environment request command of each user or the information such as a log-in ticket or the like.

In step S911, the operating environment information obtained in step S910 is transmitted. This operating environment information is returned to the peripheral apparatus side via the communication interface 408 in FIG. 4.

In step S912, whether the command is a download request command of the program or not is discriminated. If it is the download request command, step S913 follows. If it is not the download request command, step S914 follows.

In step S913, the program is downloaded. The requested program is specified from the program management table 702 via the program managing unit 602 of each user in FIG. 6 by tracing the reference information stored in the first field 701-1 from the user information management table 701 in FIG. 7 via the user information managing unit 601 in FIG. 6 from the user information added to the command or the information such as a log-in ticket or the like. The specified program is read out via the program managing unit 602 in FIG. 6 and transferred via the communication interface 408 in FIG. 4.

In step S914, whether the command is a log-out request command or not is discriminated. If it is the log-out request command, step S915 follows. If it is not the log-out request command, the processing routine of the present flowchart is finished and processes other than those in the flowchart are continued.

In step S915, the log-out information is managed and the log-in information in step S904 is cancelled.

FIG. 10 is a flowchart showing a flow for the operation of a program which is executed on the peripheral apparatus according to the embodiment.

In FIG. 10, function data held in the data managing unit 502 in FIG. 5 is read out in step S1001. For example, information indicative of the presence or absence of a duplex printing unit, information indicative of the presence or absence of a stapling unit, and the like have been disclosed in the function data.

In step S1002, an operating picture plane is displayed. In this step, various setting functions which can be handled by the program itself, values of various parameters, and the like are compared with the information obtained in step S1001, and when an operating picture plane including the functions which cannot be used is displayed, the relevant items are masked so that the user cannot operate them via the user I/F 106 in FIG. 1.

In step S1003, an operation is inputted. In this step, various processes which are inputted via the user I/F 106 in FIG. 1 are received.

In step S1004, whether the operation has been finished or not is discriminated. If it is determined that the operation has been finished, the processing routine of the present flowchart is finished.

In step S1005, whether a process is executed or not is discriminated. For example, whether a process such as printing process, reading process, or the like has been activated or not is discriminated. If it is determined that the process is executed, step S1006 follows. If it is determined that the process is not executed, the processing routine is returned to step S1002 and the updating or the like of the operating picture plane is continued.

In step S1006, the designated process is executed. In the embodiment, although contents of the process are not particularly mentioned, they are not particularly limited so long as the peripheral apparatus itself is allowed to execute the process.

Naturally, the object of the invention is also accomplished by a method whereby a memory medium in which program codes of software to realize the functions of the embodiment mentioned above have been recorded is supplied to a system or an apparatus and a computer (or a CPU, an MPU, or the like) of the system or the apparatus reads out the program codes stored in the memory medium and executes them.

In this case, the program codes themselves read out from the memory medium realize the functions of the embodiment mentioned above and the memory medium in which the program codes have been stored constructs the invention.

As a memory medium for supplying the program codes, for example, a floppy (registered trademark) disk, a hard disk, a magnetooptic disk, a CD-ROM, a CD-R, a CD-RW, a DVD-ROM, a DVD-RAM, a DVD-RW, a DVD+RW, a magnetic tape, a non-volatile memory card, a ROM, or the like can be used.

Naturally, the invention incorporates not only a case where a computer executes the read-out program codes, so that the functions of the embodiment mentioned above are realized but also a case where an OS (Operating System) or the like which is operating on the computer executes a part or all of actual processes on the basis of instructions of the program codes and the functions of the embodiment mentioned above are realized by those processes.

Further, the invention also incorporates a case where the program codes read out from the memory medium are written into a memory provided for a function expanding board inserted in a computer or a function expanding unit connected to a computer, thereafter, a CPU or the like provided for the function expanding board or the function expanding unit executes a part or all of actual processes on the basis of instructions of the program codes, and the functions of the embodiment mentioned above are realized by those processes.

As described above, according to one aspect of the invention, the program on the server can be downloaded onto the peripheral apparatus and executed and the same operating program can be used on any peripheral apparatus on the network, so that the operability is improved.

According to one aspect of the invention, in the peripheral apparatus, function data in which the functions which can be provided by the peripheral apparatus itself, the values of the parameters which are necessary when the process is executed, and the like have been described is included in the data managing means, the downloaded program reads the function data just after it was executed by the program executing means, and the user interface adapted to the function of the peripheral apparatus can be constructed. Therefore, since the operation to use the specific function is merely limited on one program, the operability of all of the peripheral apparatuses can be held in a consistent state.

According to another aspect of the invention, in the user information managing means of the server, the user levels of the administrators, general users, and the like are managed and the contents of the user interface can be changed in accordance with the function data of the peripheral apparatuses and the level of the user. Thus, since the operation of the specific function is merely limited in one program, the operability of all of the peripheral apparatuses can be held in a consistent state.

According to one aspect of the invention, in the program held by the program managing means of each user of the server, the program for the high function operation for the power user and the program for the function limited operation for the ordinary user can be managed, so that the program having higher operability according to the object can be used.

Furthermore, according to one aspect of the invention, in the operating environment managing means of each user of the server, by always updating the environment information operated by the specific user, even if any peripheral apparatus is used, the environment finally used can be reconstructed, so that the operability is improved.

What is claimed is:

1. An information processing system having a server for holding information to manage and authenticate the users who can use a network environment in which a plurality of peripheral apparatuses and a plurality of computers are connected via a network, wherein said server comprises:

communicating means for communicating with another terminal of said network environment;

user information managing means for managing user information for user authentication;

program information managing means, provided for each user, for holding program information which has been held by said user information managing means and can be used every user; and operating environment managing means, provided for each user, for holding an operating environment of each user held by said user information managing means, and said peripheral apparatus comprises:

user interface means for operating an apparatus;

communicating means for performing a log-in to said server;

information obtaining means for obtaining operating environment information of the log-in user from said operating environment managing means of each user of said server when the user is authenticated in said server;

user interface constructing means for constructing a user interface in accordance with the operating environment information of said user;

program downloading means for, when execution of a predetermined program held by said program information managing means of each user on said server is instructed by said user interface means, downloading said program whose execution has been instructed from said server;

data managing means for holding said downloaded program; and program executing means for executing said downloaded program.

2. A peripheral apparatus which can communicate with a server via a network, comprising:

user interface means for operating the peripheral apparatus;

communicating means for performing a log-in to said server;

information obtaining means for obtaining operating environment information of the log-in user from operating environment managing means of each user of said server when the user is authenticated by said server;

user interface constructing means for constructing a user interface in accordance with the operating environment information of said user;

program downloading means for, when execution of a predetermined program held by program information managing means of each user on said server is instructed by said user interface means, downloading said program whose execution has been instructed from said server;

data managing means for holding said downloaded program; and program executing means for executing said downloaded program.

3. An apparatus according to claim 2, wherein said downloaded program operates and controls the peripheral apparatus.

4. An apparatus according to claim 2, wherein in said peripheral apparatus, function data in which functions which can be provided by said peripheral apparatus itself, and values of parameters which are necessary when a process is executed, have been described is included in said data managing means, and just after said downloaded program was executed by said program executing means, said program reads said function data and provides a user interface adapted to the function of said peripheral apparatus.

5. An apparatus according to claim 4, wherein user levels of administrators or general users which are transmitted from user information managing means of said server are managed, and the function data of said peripheral apparatus and display contents of the user interface corresponding to the level of the user are obtained.

6. An apparatus according to claim 1, wherein in the program held by said program information managing means of each user of said server, a program for a high function operation for a power user and a program for a function limited operation for an ordinary user are managed.

7. An apparatus according to claim 2, wherein operating environment managing means of each user of said server always updates environment information operated by a specific user, thereby enabling the environment finally used to be always reconstructed even if any peripheral apparatus is used.

8. A server for holding information to manage and authenticate the users who can use a network environment in which a plurality of peripheral apparatuses and a plurality of computers are connected via a network, comprising:

communicating means for communicating with another terminal of said network environment;

user information managing means for managing user information for user authentication;

program information managing means, provided for each user, for holding program information which has been held by said user information managing means and can be used every user; and operating environment managing means, provided for each user, for holding an operating environment of each user held by said user information managing means.

9. A control method of controlling an information processing system having a server for holding information to manage and authenticate the users who can use a network environment in which a plurality of peripheral apparatuses and a plurality of computers are connected via a network, comprising:

a communicating step of communicating with another terminal of said network environment;

a user information managing step of managing user information for user authentication by user information managing means;

a program information managing step, provided for each user, of holding program information which has been held by said user information managing step and can be used every user by program information managing means;

an operating environment managing step, provided for each user, of holding an operating environment of each user held by said user information managing step;

a user interface step of operating an apparatus on said peripheral apparatus;

a communicating step of performing a log-in to said server as a network terminal;

an information obtaining step of obtaining operating environment information of the log-in user by said operating environment managing step of each user of said server when the user is authenticated in said server;

a user interface constructing step of constructing a user interface in accordance with the operating environment information of said user;

a program downloading step of, when execution of a predetermined program held by said program information managing step of each user on said server is instructed by said user interface step, downloading said program whose execution has been instructed from said server;

a data managing step of holding said program downloaded from said server into data managing means; and a program executing step of executing said downloaded program.

10. A control method of controlling a server for holding information to manage and authenticate the users who can use a network environment in which a plurality of peripheral apparatuses and a plurality of computers are connected via a network, comprising:

a communicating step of communicating with another terminal of said network environment;

a user information managing step of managing user information for user authentication by user information managing means;

a program information managing step, provided for each user, of holding program information which has been held by said user information managing means and can be used every user by program information managing means; and an operating environment managing step, provided for each user, of holding an operating environment of each user held by said user information managing means.

11. A control method of controlling a peripheral apparatus which is connected to a computer via a network, comprising:

a user interface step of operating an apparatus on said peripheral apparatus;

a communicating step of performing a log-in to a server for holding information to manage and authenticate the users who can use a network environment in which said peripheral apparatus as a network terminal and said computer are connected via the network;

an information obtaining step of obtaining operating environment information of the log-in user from operating environment managing means of each user of said server when the user is authenticated by said server;

a user interface constructing step of constructing a user interface in accordance with the operating environment information of said user;

a program downloading step of, when execution of a predetermined program held by program information managing means of each user on said server is instructed by said user interface step, downloading said program whose execution has been instructed from said server;

a data managing step of holding said downloaded program by data managing means; and a program executing step of executing said downloaded program.

12. A method according to claim 11, wherein said downloaded program operates and controls the peripheral apparatus.

13. A method according to claim 11, wherein in said peripheral apparatus, function data in which functions which can be provided by said peripheral apparatus itself, and values of parameters which are necessary when a process is executed, have been described is included in said data managing step, and just after said downloaded program was executed by said program executing step, said program reads said function data and provides a user interface adapted to the function of said peripheral apparatus.

14. A method according to claim 13, wherein user levels of administrators or general users which are transmitted from a user information managing step of said server are managed, and the function data of said peripheral apparatus and display contents of the user interface corresponding to the level of the user are obtained.

15. A method according to claim 11, wherein in the program held by said program information managing means of each user of said server, a program for a high function operation for a power user and a program for a function limited operation for an ordinary user are managed.

16. A method according to claim 11, wherein in an operating environment managing step of each user of said server, by always updating environment information operated by a specific user, the environment finally used can be always reconstructed even if any peripheral apparatus is used.

17. A computer-readable memory medium which stores a computer-readable control program for controlling an information processing system having a server for holding information to manage and authenticate the users who can use a network environment in which a plurality of peripheral apparatuses and a plurality of computers are connected via a network, wherein said control program allows a CPU to execute:

a communicating step of communicating with another terminal of said network environment;

a user information managing step of managing user information for user authentication;

a program information managing step, provided for each user, of managing program information which has been held by said user information managing step and can be used every user;

an operating environment managing step, provided for each user, of holding an operating environment of each user managed by said user information managing step;

a user interface step of operating an apparatus on said peripheral apparatus;

a communicating step of performing a log-in to said server as a network terminal;

an information obtaining step of obtaining operating environment information of the log-in user by said operating environment managing step of each user of said server when the user is authenticated in said server;

a user interface constructing step of constructing a user interface in accordance with the operating environment information of said user;

a program downloading step of, when execution of a predetermined program held by said program information managing step of each user on said server is instructed by said user interface step, downloading said program whose execution has been instructed from said server; and a data managing step of managing said downloaded program.

18. A computer-readable control program stored on a computer-readable memory medium, the program for controlling a server for holding information to manage and authenticate the users who can use a network environment in which a plurality of peripheral apparatuses and a plurality of computers are connected via a network, wherein said control program allows a CPU to execute:

a communicating step of communicating with another terminal of said network environment;

a program information managing step, provided for each user, of managing program information which can be used by every user in a user information managing step of managing user information for user authentication; and an operating environment managing step, provided for each user, of managing a held operating environment of each user.

19. A computer-readable memory medium which stores a computer-readable control program for controlling a peripheral apparatus which is connected to a computer via a network, wherein said control program allows a CPU to execute:

a user interface step of operating an apparatus on the peripheral apparatus;

a communicating step of performing a log-in to a server for holding information to manage and authenticate the users who can use a network environment in which said peripheral apparatus as a network terminal and said computer are connected via the network;

an information obtaining step of obtaining operating environment information of the user who performed the log-in to said server when the user is authenticated by said server;

a user interface constructing step of constructing a user interface in accordance with the operating environment information of said user;

a program downloading step of, when execution of a program managed on said server is instructed by said user interface step, downloading said program whose execution has been instructed from said server;

a data managing step of managing said downloaded program; and a program executing step of executing said downloaded program.

* * * * *

UNITED STATES PATENT AND TRADEMARK OFFICE
CERTIFICATE OF CORRECTION

| | |
|---|---|
| PATENT NO. | : 7,178,032 B2 |
| APPLICATION NO. | : 10/347935 |
| DATED | : February 13, 2007 |
| INVENTOR(S) | : Osada |

It is certified that error appears in the above-identified patent and that said Letters Patent is hereby corrected as shown below:

SHEET 8:
Fig. 9, S909, "ENVIRONMENT EACH" should read -- ENVIRONMENT OF EACH --.

COLUMN 2:
Line 2, "used every" should read -- used by every --.

COLUMN 4:
Line 59, "used every" should read -- used by every --.

COLUMN 6:
Line 21, "be used" should read -- be used by --.

COLUMN 7:
Line 23, "the low-in," should read -- the log-in, --.

COLUMN 10:
Line 26, "used every" should read -- used by every --.

COLUMN 11:
Line 50, "used every" should read -- used by every --.

COLUMN 12:
Line 3, "used every" should read -- used by every --; and
Line 43, "used every" should read -- used by every --.

UNITED STATES PATENT AND TRADEMARK OFFICE
CERTIFICATE OF CORRECTION

PATENT NO. : 7,178,032 B2
APPLICATION NO. : 10/347935
DATED : February 13, 2007
INVENTOR(S) : Osada It is certified that error appears in the above-identified patent and that said Letters Patent is hereby corrected as shown below:

COLUMN 13:
Line 52, "used every" should read -- used by every --.

Signed and Sealed this

Thirteenth Day of November, 2007

JON W. DUDAS
*Director of the United States Patent and Trademark Office*